United States Patent Office 3,265,602
Patented August 9, 1966

3,265,602
METHOD OF PRODUCING HYDRAZINE
Meyer Steinberg, Huntington Station, Jacob Pruzansky, East Islip, and Henry Kramer, Bayside, N.Y., assignors to the United States of America as represented by the United States Atomic Energy Commission
No Drawing. Filed Sept. 25, 1962, Ser. No. 226,778
4 Claims. (Cl. 204—157.1)

The present invention relates to the production of hydrazine and is concerned particularly with a novel method of making hydrazine from the radiolysis of ammonia in the presence of sodium-alumino-silicate zeolites.

In recent years the use of hydrazine as a missile propellant has assumed large importance. However, the use of hydrazine is not confined to military purposes. Its use in the treatment of boiler feed water is a well established practice; it is useful in fuel cells, and its power as a reducing agent is receiving recognition in both the organic and inorganic chemical fields.

A major obstacle to wider use of hydrazine is its present high cost. The only commercially significant synthesis is the Raschig process which involves the partial oxidation of ammonia by hypochlorite. This process, which requires the use of both chlorine and caustic, produces a crude aqueous liquor containing about 2% hydrazine. The cost of concentrating this by evaporation accounts for about 16% of the total factory cost of hydrazine hydrate.

In an effort to improve on existing processes, hydrazine has been synthesized by the irradiation of liquid ammonia with fission fragments and by pile irradiation in a neutronic reactor. While these methods have succeeded in producing hydrazine, a source of neutrons is required. Accordingly, attempts have been made to synthesize hydrazine by irradiating liquid ammonia with gamma rays from a cobalt-60 source. The G values for hydrazine so produced have been disappointing—of the order of 0.1 or less. Investigations at the Brookhaven National Laboratory revealed that the G value could be increased to approximately 0.28 by cobalt-60 gamma irradiation of an aqueous solution of ammonia in which the ammonia was present in an amount equal to about 60–70 weight percent, the solution being subjected to a pressure of about 70 p.s.i.a. This was found to be about 30–40 times the G value for 100% liquid ammonia (0.0075) when performed in stainless steel vessels. Notwithstanding the improvement in G values secured by this method, the investment costs necessitated by the pressure requirements and the reaction rate are excessive for commercial consideration.

It is an object of this invention to provide a new and improved method for the radiolytic synthesis of hydrazine from ammonia.

We have devised a new and improved method of synthesizing hydrazine by cobalt-60 gamma irradiation of ammonia. In accordance with this method, G ($N_2H_4$) values as high as 1.0 have been obtained using anhydrous ammonia and without resort to high pressure. The method consists in adsorbing anhydrous ammonia on a substrate of a dry sodium-alumino-silicate zeolite in powder form at atmospheric pressure and a temperature of 0° C. in a vessel free of heavy metals. The vessel is then evacuated and exposed to gamma ray irradiation from cobalt-60 at a dose rate of about $1.3 \times 10^6$ to $2.2 \times 10^6$ rad/hours to a total dose of $0.5 \times 10^6$ to $2.0 \times 10^6$ rads. The vessel is then opened, and the hydrazine produced by the irradiation is extracted with a plurality of aqueous washes, followed by a final extraction with $10^{-4}$ molal hydrochloric acid.

The invention may be understood in greater detail by reference to experimental investigation summarized in Table I, infra. In these experiments the ammonia used was 99.95% pure, and infra-red spectra revealed only trace quantities of water and organic material. A variety of mineral solids were used, as set forth in the Table.

*Preparation of the mineral solids*

Prior to use, the solids were reduced to fine powders having a surface area of approximately 700–900 square meters per gram as measured by the standard BET method.

A fixed volume of about 16 cc. of powder was weighed and transferred to a heavy walled Pyrex irradiation vessel equipped with a break seal. Earlier work on radiolysis of aqueous ammonia in stainless steel vessels demonstrated the importance of avoiding irradiation in vessels containing heavy metals. Brown oxide (rust) particles were present in some solutions taken from stainless steel vessels and are believed to have reduced the yield of hydrazine.

After insertion of the powder in the irradiation vessels, a void space of about 8 cc. remained.

The solids were preconditioned by evacuation and heating at 300° C. in a vacuum rack for 18 hours.

*Introduction of ammonia*

After evacuation to a pressure of $<10^{-5}$ mm. Hg, the irradiation vessel was closed and immersed in an ice bath at 0° C. Ammonia ($NH_3$) was then introduced into the vessel and equilibrated at 1 atmosphere pressure for ammonia sorption. In the case of certain solids, as will be seen by reference to Table I, ammonia sorption did not occur at 0° C. These samples were therefore immersed in liquid nitrogen, causing ammonia to be condensed on the powdered mineral solids. The quantity of ammonia gas sorbed or condensed into each irradiation vessel was determined manometrically, after which the vessels were again pumped down to a pressure of $10^{-5}$ mm. Hg and sealed.

*Irradiation*

The samples prepared as above were irradiated by gamma photons from a cobalt-60 source. Dose rates varied from about 0.285 megarads/hour to about 4.5 megarads/hour. The total dose in magarads varied between about 0.5 to 40 megarads. In each case dosimetry maesurements were made with standard ferrous sulfate solutions. The amount of energy absorbed by the solutions was calculated from the known relationship $G(Fe^{2+} \rightarrow Fe^{3+}) = 15.6$.

*Determination of hydrazine produced*

After irradation, each sample was first cooled in a liquid nitrogen bath and then the break seal was opened in a beaker under 50 ml. of water. The ammonia was slowly absorbed by the water and the contents of the irradiation vessel were washed into the beaker. The mixture was stirred with a magnetic stirrer for five to ten minutes and then decanted into a 250 ml. volumetric flask. The residue in the beaker was washed with an additional 50 ml. of water and finally with dilute HCl ($10^{-4}$ M) in the same fashion. The solution was made to volume (250 ml.) and a small quantity was filtered through a millipore filter to eliminate turbidity. A suitable aliquot was analyzed colorimetrically using p-dimethylaminobenzaldehyde as described by Watts and Chrisp, Anal. Chem., 24, 2006–

2008 (1952). The presence of hydrazine was verified by scanning the 458μ band with a spectrophotometer.

Results

The results of the foregoing experiments are summarized in Table I, which shows the hydrazine yield expressed first in terms of molecules formed per 100 electron volts of gamma ray energy absorbed in the ammonia alone, and then by the entire contents of the vessel including the solid powder. This is compared with the results for gamma irradiation of liquid ammonia for comparable irradiation rates and doses in the absence of the powdered solid material. Such a comparison shows that the maximum G value for hydrazine formation was 0.99 based on energy absorbed in ammonia alone (Experiment No. 13) in contrast to a G value of only 0.10 in anhydrous liquid ammonia subjected to cobalt-60 gamma rays. In experiment 11 the G value in ammonia alone obtained by the subject method (0.97) is about 12.4 times the G value (0.078) for liquid ammonia.

The results of the experiments tabulated in Table I further show that the production of hydrazine in milligrams is dose dependent and that as the total dose is increased from 0.5 to 2.0 megarads, the hydrazine yield increases in a nonlinear manner. It is concluded, therefore, that the total doses in excess of 2.0 megarads will produce proportionately larger yields of hydrazine.

It is also to be observed that the dose rate has a relatively minor relationship to the yield. For example, in Experiments 11 through 13, the dose rate varied from a low of 0.285 megarads/hr. to 2.0 megarads/hr., yet the G values for ammonia alone were substantially identical.

It is deemed significant that superior results were obtained by use of washed sodium-alumino-silicate containing no binder. The binder present in Experiments 6 through 9 was a clay having a high percentage of exchangeable iron. Since iron reacts with hydrazine both in acid and alkaline solutions, it is belived that the water soluble contaminants reduced the yield of hydrazine in these experiments. Hence, the sodium-alumino-silicate should be washed with water followed by dilute hydrochloric acid and freed of water soluble contaminants such as iron and nitrate ions prior to use in the process.

When one compares the rate, Q, of hydrazine production using the present process to that using anhydrous ammonia alone, it is seen that the ratio of yields is 1.2 to 3.3. This information, which is summarized in Table II, indicates that the sodium-alumino-silicate participates in the reaction and increases the yield of hydrazine, whereas other mineral solids were ineffective.

The theoretical explanation for this improvement is not fully understood. Unquestionably, ammonia is occluded in the zeolite pore structure of the sieve. The pore sites are not completely saturated with ammonia and can therefore act as collector sites for the atomic hydrogen which subsequently forms molecular hydrogen. The molecular hydrogen may then diffuse out of the pores and collect on other sieve sites, thereby minimizing the recombination reaction:

$$NH_2 + H + M \rightarrow NH_3 + M$$

(where M is a wall).

However, when the relative rate data of Table II are taken into consideration it seems more reasonable to assume an energy transfer function for the sieve in the formation of hydrazine. As shown in Table II, this rate of hydrazine formation is 1.2 to 3.3 times faster in the presence of the sieve. This increase may be due to an increase in the reaction rate of intermediates formed in the adsorbed layer, or by simple increase of $NH_3$ concentration due to adsorption, or it may be due to reactive intermediates from the bulk substrate diffusing to the surface and there undergoing catalyzed reactions. Whatever the true explanation, the fact is clearly established that significantly increased yields are secured when the ammonia is sorbed in a washed bed of sodium-alumino-silicate.

TABLE I.—HYDRAZINE YIELD IN THE RADIOLYSIS OF AMMONIA ON MINERAL SOLIDS

| Exp. No. | Trade Name | Approx. Chem. Comp. and Particle Size | $NH_3$ Condition | Wt. $NH_3$ Grams | Wt. Solid Grams | Dose Rate, Megarads/hr. | Total Dose, Megarads | Wt. $N_2H_4$, Mg. | $G(N_2H_4)$ $NH_3$ Alone | $G(N_2H_4)$ $NH_3+$ Solid | $G(N_2H_4)$ [1] Liquid $NH_3$ |
|---|---|---|---|---|---|---|---|---|---|---|---|
| 1 | Ignited Alum. Oxide | $Al_2O_3$, 74–100μ | Sorbed | 0.046 | 16.0 | 0.426 | 40 | 0.00069 | 0.011 | 0.000032 | 0.0049 |
| 2 | γ-Alum. Oxide | $Al_2O_3$ | Condensed | 3.59 | 18.5 | 1.3 | 1.0 | 0.050 | 0.42 | 0.068 | (0.10) |
| 3 | Cocoanut Charcoal | C, 74–300μ | Sorbed | 0.89 | 8.0 | 0.426 | 40 | Nil | Nil | Nil | 0.0049 |
| 4 | Sodium Metasilicate Pentahydrate | $Na_2SiO_3 \cdot 5H_2O$ | Condensed | 2.29 | 21.3 | 1.3 | 1.0 | 0.0016 | 0.021 | 0.0020 | (0.10) |
| 5 | Anakrom A B S | Diatomaceous earth high in $SiO_2$ 137–149μ | do | 2.78 | 17.0 | 0.285 | 1.0 | 0.013 | 0.14 | 0.020 | 0.10 |
| 6 | Molecular Sieve Pellets, 5A | 0.75 CaO, 0.25 $Na_2O$, 1.00 $Al_2O_3$, 2.00 $SiO_2 \cdot XH_2O$ +Binder, $\frac{1}{16}''$ pellets | Sorbed | 2.30 | 14.5 | 0.426 | 40 | 0.084 | 0.027 | 0.0088 | 0.0049 |
| 7 | Sieve Pellets, 13X | 0.83 $Na_2O$, 1.0 $Al_2O_3$, 2.48 $SiO_2 \cdot XH_2O$+Binder, $\frac{1}{16}''$ pellets | do | 2.27 | 16.0 | 1.3 | 1.0 | 0.033 | 0.44 | 0.054 | (0.10) |
| 8 | As 7 | As 7 | Condensed | 4.18 | 15.0 | 1.3 | 1.0 | 0.0063 | 0.060 | 0.013 | (0.10) |
| 9 | As 7 | As 7 | Sorbed | 2.45 | 16.0 | 4.5 | 1.0 | 0.066 | 0.81 | 0.11 | 0.110 |
| 10 | Molecular Sieve Powder, 13X | 0.83 $Na_2O$, 1.0 $Al_2O_3$, 2.48 $SiO_2 \cdot XH_2O$ No Binder, 0.8–1.2μ | do | 2.06 | 13.6 | 2.2 | 0.5 | 0.021 | 0.61 | 0.081 | 0.110 |
| 11 | As 10 | As 10 | do | 2.75 | 15.6 | 1.3 | 2.0 | 0.177 | 0.97 | 0.14 | (0.078) |
| 12 | As 10 | As 10 | do | 1.66 | 14.6 | 1.3 | 1.0 | 0.066 | 0.92 | 0.094 | 0.095 |
| 13 | As 10 | As 10 | do | 1.15 | 14.6 | 0.285 | 1.0 | 0.038 | 0.99 | 0.072 | 0.10 |
| 14 | Uran. Diox | $UO_2$ | Condensed | 4.19 | 21.0 | 1.3 | 1.3 | 0.012 | 0.066 | 0.011 | (0.095) |
| 15 | Uran. Diox | $U_3O_8$ | do | 4.11 | 36.9 | 1.3 | 1.3 | 0.0043 | 0.024 | 0.0024 | (0.095) |
| 16 | Uranyl Oxide | $UO_3$ | do | 4.19 | 16.7 | 1.3 | 1.3 | 0.0086 | 0.048 | 0.0098 | (0.095) |

[1] The $G(N_2H_4)$ values for anhydrous liquid $NH_3$ alone indicate interpolated values.

It will be seen that the present method represents a substantial improvement in the synthesis of hydrazine by cobalt-60 gamma irradiation of ammonia and produces G values as high as 12.4 times as large as those obtained by radiolysis of anhydrous liquid ammonia without the step of sorbing the ammonia on a substrate of sodium-aluminosilicate.

While gamma irradiation from cobalt-60 was used in the foregoing examples, it is to be understood that other sources of radiation, such as nuclear reactors, and fission fragments may be substituted in the radiolysis of ammonia sorbed on sodium-alumino-silicate zeolites in accordance with this invention.

TABLE II.—RATIO OF G($N_2H_4$) VALUES AND RELATIVE RATES OF HYDRAZINE FORMATION USING SODIUM-ALUMINO-SILICATE SUBSTRATE

| Exp. No. | Ratio of G($N_2H_4$) Values $\frac{G(N_2H_4)(NH_3\ Alone)}{G(N_2H_4)(NH_3,\ Liquid)}$ | Dose Rate, Megarads/hr. | Total Dose, Megarads | Density Ratio $\frac{\rho(NH_3+Sieve)}{\rho(NH_3,\ Liquid)}$ | Ratio $N_2H_4$ Rates *$\frac{Q(NH_3+Sieve)}{Q(NH_3,\ Liquid)}$ |
|---|---|---|---|---|---|
| 10 | 5.5 | 2.2 | 0.50 | 1.58 | 1.2 |
| 11 | 12.4 | 1.3 | 2.0 | 1.85 | 3.3 |
| 12 | 9.70 | 1.3 | 1.3 | 1.64 | 1.6 |
| 13 | 9.90 | 0.285 | 1.0 | 1.59 | 1.2 |

*Where $\frac{Q(NH_3+Sieve)}{Q(NH_3,\ Liquid)} = \frac{G(N_2H_4)(NH_3+Sieve)}{G(N_2H_4)(NH_3,\ Liquid)} \times \frac{\rho(NH_3+Sieve)}{\rho(NH_3,\ Liquid)}$

We claim:
1. In the process of radiation induced synthesis of hydrazine from ammonia, the improvement that consists in the steps of sorbing the ammonia on a substrate of a washed finely divided sodium-alumino-silicate, irradiating the ammonia while sorbed on the substrate, and recovering the resulting hydrazine from the substrate.

2. A process as set forth in claim 1 wherein the adsorption step consists in introducing ammonia into an evacuated vessel free of heavy metals and containing the finely divided sodium-alumino-silicate, equilibrating at atmospheric pressure and a temperature of zero degrees centigrade, and then evacuating the vessel and contents to a pressure of at least $10^{-5}$ mm. Hg, prior to the irradiation step.

3. A process as set forth in claim 2 wherein the hydrazine is recovered from the substrate with a plurality of aqueous washes followed by a final extraction with $10^{-4}$ molal hydrochloric acid.

4. A process for the manufacture of hydrazine comprising: preparing a dry sodium-alumino-silicate zeolite substrate in powder form free from water extractable contaminants and having a surface area of approximately 700 to 900 square meters per gram as measured by the BET method; adsorbing anhydrous ammonia on said substrate and equilibrating at atmospheric pressure and a temperature of zero degrees centigrade in a vessel free of heavy metals; evacuating said vessel and contents to a pressure of at least $10^{-5}$ mm. Hg and sealing said vessel; exposing said vessel and contents to gamma ray irradiation from a cobalt-60 source at a dose rate of $1.3 \times 10^{-6}$ to $2.2 \times 10^{-6}$ rads/hr. to a total dose of $.5 \times 10^6$–$2 \times 10^6$ rads/hr. at a temperature of about 50° C.; and at the termination of the exposure opening said vessel and extracting hydrazine from said substrate with a plurality of aqueous washes followed by a final extraction with $10^{-4}$ molal hydrochloric acid.

References Cited by the Examiner

UNITED STATES PATENTS 2,675,300  4/1954  Haller _____ 23—190
3,002,911  10/1961  Sutherland et al. _____ 204—154

JOHN H. MACK, *Primary Examiner.*

H. S. WILLIAMS, *Assistant Examiner.*